(12) United States Patent
Brandreth, III

(10) Patent No.: US 8,444,929 B2
(45) Date of Patent: May 21, 2013

(54) ADJUSTABLE CHEMICAL DISPENSER SYSTEM

(76) Inventor: John B. Brandreth, III, Canton, GA (US)

( * ) Notice: Subject to any disclaimer, the term of this patent is extended or adjusted under 35 U.S.C. 154(b) by 1268 days.

(21) Appl. No.: 12/004,289

(22) Filed: Dec. 20, 2007

(65) Prior Publication Data

US 2008/0152556 A1 Jun. 26, 2008

Related U.S. Application Data

(60) Provisional application No. 60/876,335, filed on Dec. 21, 2006.

(51) Int. Cl.
*B01D 11/02* (2006.01)
(52) U.S. Cl.
USPC ............ 422/264; 422/277; 422/278; 210/205
(58) Field of Classification Search
USPC ................. 422/264, 277, 276, 278; 210/205, 210/206
See application file for complete search history.

(56) References Cited

U.S. PATENT DOCUMENTS

| | | | |
|---|---|---|---|
| 4,347,224 A | 8/1982 | Beckert et al. | |
| 4,780,197 A | 10/1988 | Schuman | |
| 5,350,509 A * | 9/1994 | Nelson | 422/277 |
| 5,580,448 A | 12/1996 | Brandreth, III | |
| 5,897,770 A * | 4/1999 | Hatch et al. | 422/264 |
| 6,267,886 B1 | 7/2001 | Brandreth, III | |
| 6,280,617 B1 | 8/2001 | Brandreth, III | |
| 6,855,252 B2 | 2/2005 | Brandreth, III | |
| 6,855,300 B2 * | 2/2005 | Cormier | 422/264 |
| 7,060,190 B2 * | 6/2006 | King et al. | 422/265 |

* cited by examiner

*Primary Examiner* — Michael Marcheschi
*Assistant Examiner* — Timothy Cleveland
(74) *Attorney, Agent, or Firm* — Thomas C. Saitta

(57) ABSTRACT

An adjustable device for delivering chemical solutions into a liquid flow, where a saturated chemical solution is created by dissolving solid chemical contained within a chemical dispensing chamber, the device retained within a housing connected into a fluid flow line such that liquid for treatment flows therethrough. The device allows for adjustment or control of the amount of liquid flow into the dispensing chamber, the amount of saturated chemical solution drawn from the dispensing chamber by the main liquid flow, and the amount of main liquid flow through the device.

17 Claims, 3 Drawing Sheets

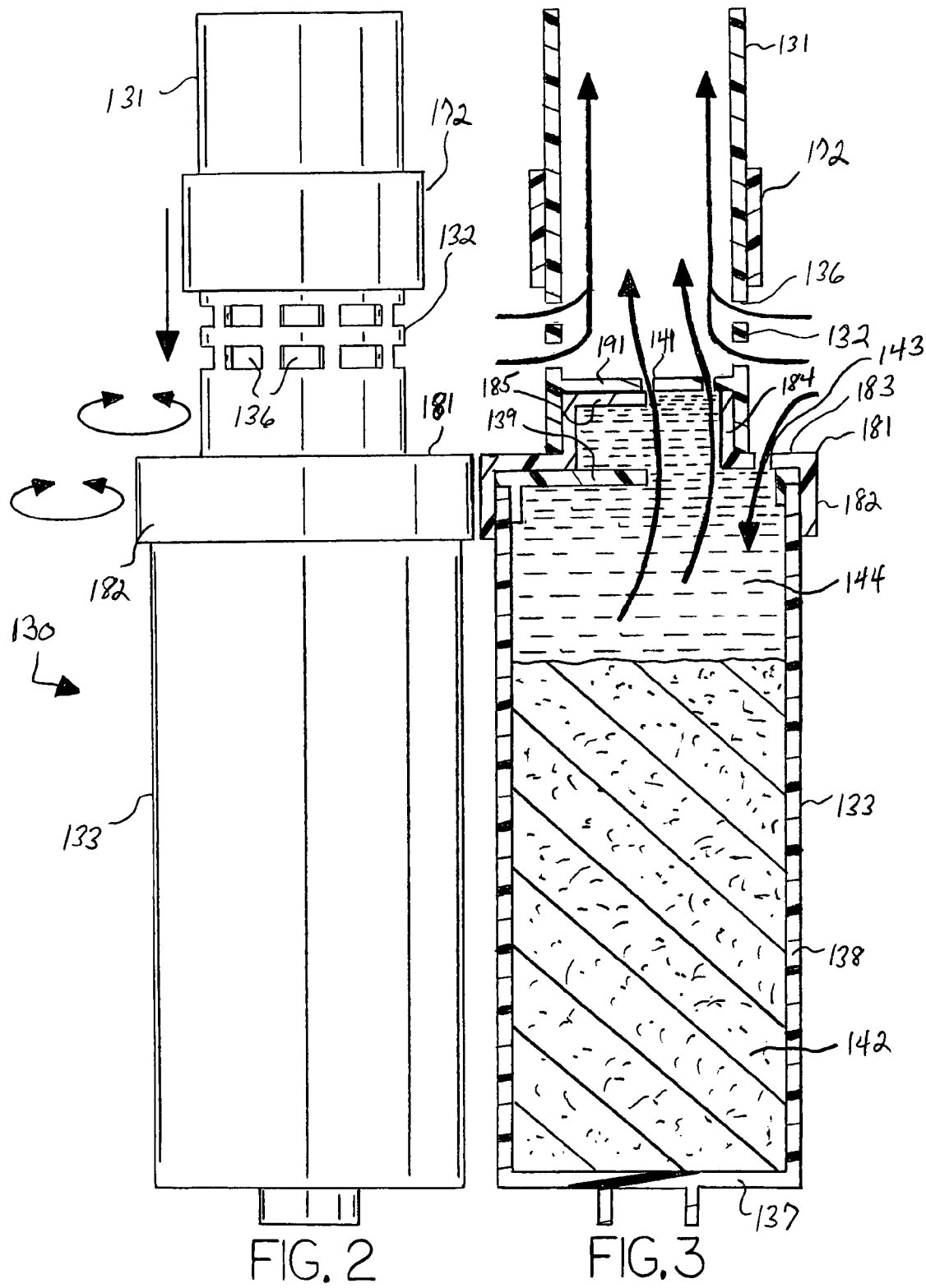

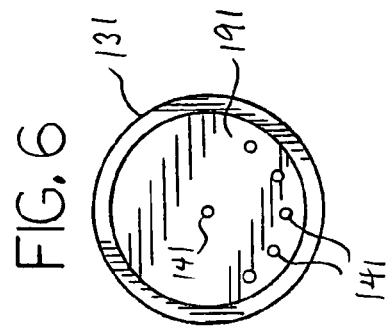
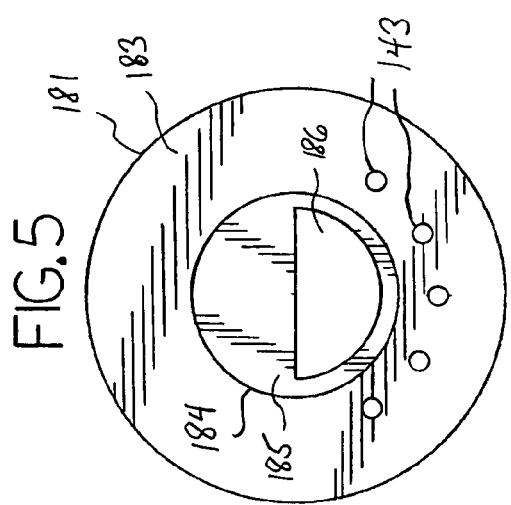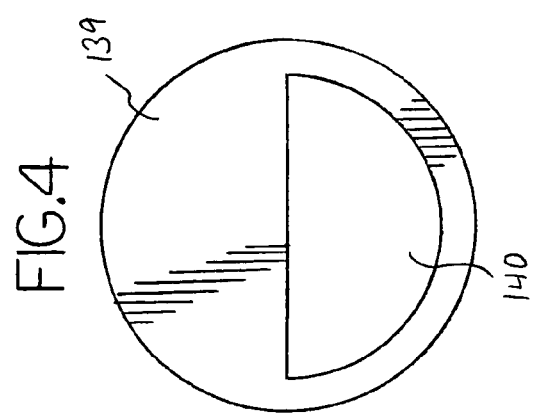
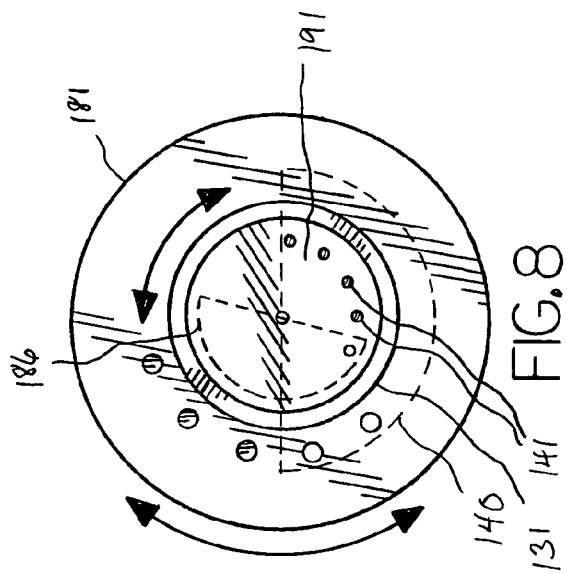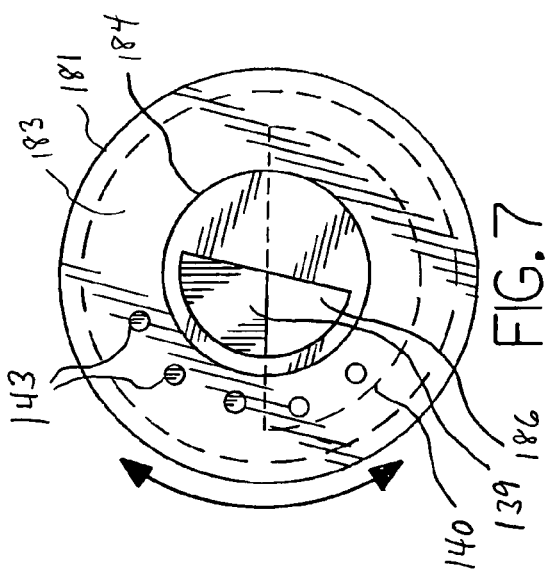

ADJUSTABLE CHEMICAL DISPENSER SYSTEM

This application claims the benefit of U.S. Provisional Patent Application Ser. No. 60/876,335, filed Dec. 21, 2006.

BACKGROUND OF THE INVENTION

This invention relates generally to the field of dispenser devices used to introduce into a flowing liquid small quantities of a chemical solution created by dissolving a solid or granular chemical. More particularly, the invention relates to such devices to be used as a component in assemblies of the type commonly used for filtration of water in circulation or supply systems, where the rate of introduction of the dissolved chemical into the water is controlled in a manner related to the flow volume of the water stream to insure proper concentration percentage. Even more particularly, the invention relates to such devices wherein one or more flow rates can be adjusted as required.

It is desirable or necessary in many water supply or recirculation systems, such as water for household or industrial use, or water for use in spas and pools, to add certain chemicals to the water to control bacteria or fungal growth, corrosion, scale deposits, etc. Commonly known additives include chlorine, polyphosphate or sodium silicate. Such additives are typically supplied in solid or granular form for ease of handling, and must therefore be dissolved in liquid and introduced into the water flow. It is imperative that the chemical additives be supplied in the proper concentration, and it is important that the mechanism for adding the chemical solutions provide for proper rate introduction with little variation in concentration. Many conventional systems fail these criteria, the mechanisms being unable to prevent variations in concentration and introduction rates, especially in circumstances where the water flow is not continuous and varies in pressure.

The most simplistic solid chemical additive mechanisms simply divert all or a portion of the water flow stream through a container holding the solid chemical. The water flowing from the container will then include an amount of dissolved chemical. These devices suffer from lack of dispensing control, since the amount of chemical present in the outflow is dependent on the volume of solid chemical in the container. As that volume decreases, the concentration of dissolved chemical in the outflow also decreases. Additionally, this type of system produces a highly concentrated chemical surge when water flow is resumed after being shut off for a period of time. Finally, variation in the water flow rate will not correspondingly alter the dissolving rate of the chemical, producing incorrect concentration amounts in the outflow.

Attempts have been made to develop a mechanism which addresses the problems encountered in correctly metering and controlling the chemical introduction and concentration rates, but known systems are either overly complicated or do not fully solve all the problems set forth above. A complicated mechanism is described in U.S. Pat. No. 4,780,197 to Schuman, which discloses a flow-through chemical dispenser cartridge positioned within the internal core of a filter which requires one or more operational valves to perform effectively. A more simplified approach is shown in U.S. Pat. No. 4,347,224 to Beckert et al. This patent discloses a flow housing which contains an internally mounted chemical cartridge. A small amount of the water flow is diverted into the bottom of the chemical cartridge and the chemical solution is drawn through a small aperture in the top of the cartridge by the pressure differential created by the flow of the bulk of the water passing through the housing. This apparatus provides a simple approach to solving the problems encountered in standard solid chemical systems, but the mechanism is just a variation of the standard system where a portion of the water stream is passed through the solid chemical before being returned to the main flow stream. The distinction in Beckert et al. is that the cartridge containing the solid chemical is mounted internal to a large housing through which all the water flows. The sizing of the cartridge is such to create an annular passage down to the bottom of the chemical cartridge, where the water flows through a plurality of liquid inlet holes, past the chemical and out the liquid outlet hole. In effect, the annular passage is just a substitute for a small bypass conduit as found in many old systems, and the problems associated with variations in concentration and surging would still be present.

More to the point of the invention at hand, my U.S. Pat. No. 5,580,448, U.S. Pat. No. 6,267,886, U.S. Pat. No. 6,280,617 and U.S. Pat. No. 6,855,252 each disclose an improved chemical dispenser system, the disclosure of all of which are incorporated herein by reference. It is an object of this invention to improve on the chemical dispenser systems disclosed in those patents, by providing a chemical dispenser that is adjustable relative to multiple flow rates, such that the concentration can be varied to compensate for flow rate and the particular solid chemical to be dissolved. It is a further object to provide such an adjustable chemical dispenser that can either be preset prior to initiation or changed as conditions change.

SUMMARY OF THE INVENTION

The invention is an improved chemical dispensing device, preferably in the form of a self-contained cartridge, which is adapted to be incorporated within a flow-through housing having an inlet opening connected to a water supply conduit, and an outlet opening connected to a water outflow conduit. The housing is adapted to receive a centrally positioned, generally tubular, chemical dispensing device comprising a lower portion chemical dispensing chamber having a closed bottom, a side wall, and a partially open top wall, a solid or granular chemical additive being retained within this lower portion, and an upper tubular conduit portion rotatably connected to the dispensing chamber by a rotatable inflow gate member.

The inflow gate member is provided with a plurality of intake refill apertures, the apertures being spaced such that by rotation of the gate member relative to the dispensing chamber, any number of the refill apertures may be closed or exposed as desired in order to control the amount of refill water passing into the chemical dispenser to create a saturated chemical solution. The gate member further comprises an extended tubular neck, the top wall of the neck member likewise having an opening. The upper tube conduit is provided with a lower wall that contains a plurality of dispensing apertures, the apertures being spaced such that by rotation of the upper tube relative to the gate member, any number of dispensing apertures may be closed or exposed as desired in order to control the amount of saturated chemical solution that is drawn into the upper tube. The upper tube is provided with an apertured midsection comprising a plurality of flow openings for passage of water from the housing into the upper tube, and a sliding collar is positioned on the upper tube, whereby the position of the sliding collar can be adjusted to cover some of the flow apertures if the water flow is to be reduced.

BRIEF DESCRIPTION OF THE DRAWINGS

FIG. 2 is a side view of the invention.

FIG. 3 is a cross-sectional view of the invention.

FIG. 4 is a top view showing the top wall and opening of the dispensing chamber.

FIG. 5 is a top view of the rotatable inflow gate member.

FIG. 6 is a top view of the rotatable upper tube and its lower wall.

FIG. 7 is a top view showing the inflow gate member positioned on the dispensing chamber and rotated such that three of five intake refill apertures are closed off by the top wall of the dispensing cartridge chamber.

FIG. 8 is a top view showing the upper tube positioned on the neck portion of the inflow gate member and rotated such that four of the five outer dispensing apertures are closed off by the neck top wall.

DETAILED DESCRIPTION OF THE INVENTION

Figure 1:
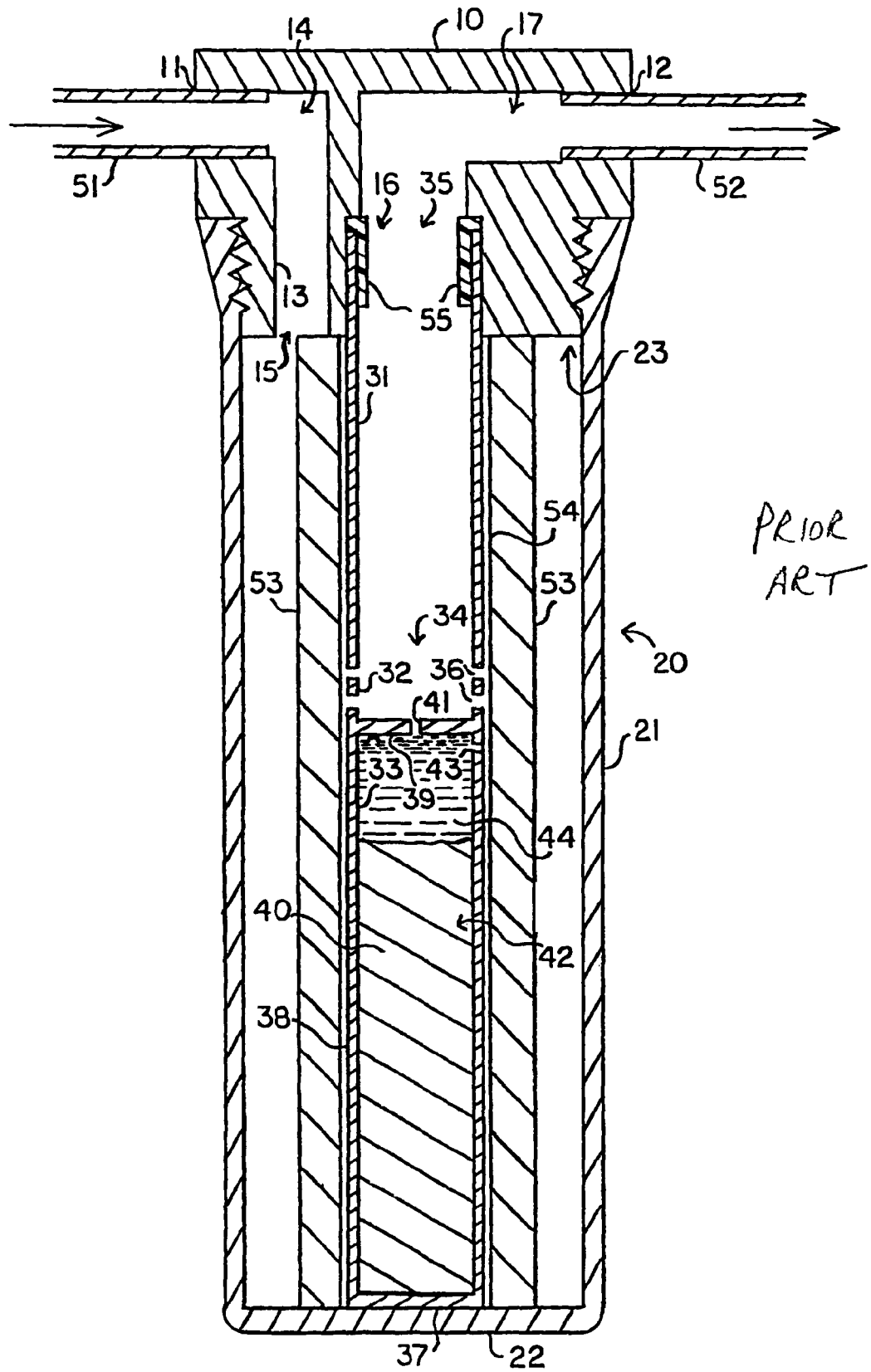
FIG. 1 is an illustration of prior art, showing a non-adjustable chemical dispenser device within a housing.

The invention is in general an improved chemical dispenser system for introducing into a flowing liquid small quantities of a chemical solution created by dissolving a solid or granular chemical, the invention being used as a component in housing assemblies of the type commonly used for filtration or treatment of water in circulation or supply systems, where the rate of introduction of the dissolved chemical into the water is adjustable in response to multiple variables, such as the flow volume of the water stream, the nature of the chemical being dissolved, etc., to insure proper concentration percentage in the out-flowing liquid. The invention has means to adjust the rate of liquid inflow into the dispensing chamber, means to adjust the rate of outflow of saturated chemical solution from the dispensing chamber, and means to adjust the rate of liquid flow through the adjustable chemical dispensing means. For ease of discussion, references to the term water as used herein shall be taken to include any liquid which is to be treated or filtered as described.

A prior art, non-adjustable chemical dispensing system is shown in FIG. 1 and first described below, followed by the detailed description of the adjustable chemical dispensing system that is illustrated in FIGS. 2 through 8.

FIG. 1 illustrates a representative prior art chemical dispenser system wherein the dispenser cartridge is not adjustable as to flow rates, the chemical dispenser comprising in general a fixed base member 10, a generally cylindrical housing 20 having an open top and adapted to be joined to base member 10, and a chemical dispensing means 30 contained within housing 20. The fixed base member 10 is adapted to be connected in a water flow line, such that base member 10 is provided with an inlet opening 11, typically threaded, to receive the end of an inlet conduit 51 to deliver water or another liquid into the base member 10. Base member 10 is also provided with an outlet opening 12, also typically threaded, to receive the end of an outlet conduit 52, for delivery of the treated water or other liquid for usage. The base member 10 is provided with a depending mating means 13, such as a threaded annular flange, to matingly receive the cylindrical housing 20. The inlet opening 11 connects to an inflow conduit 14 which diverts the water flow downward through a downflow opening 15 beneath the base member 10, the downflow opening 15 being positioned to deliver the water into the interior of the cylindrical housing 20 adjacent the outer wall 21. The housing 20 is a hollow container having an outer wall 21, closed bottom 22 and open top 23, the upper portion of the housing being threaded to mate in a detachable manner with the depending flange mating means 13, the combination of base member 10 and housing 20 forming a closed system whereby the water passes from the downflow opening 15 and can only exit from the housing 20 through a centrally located upflow opening 16, which is connected to the outlet opening 12 of base member 10 by outflow conduit 17.

Centrally positioned within housing 20 is chemical dispensing means 30. Dispensing means 30 is a generally tubular member comprising three main segments, an upper conduit 31, an apertured midsection 32 and a lower chemical containing cartridge member 33. The upper conduit 31 has an open bottom 34 and an open top 35, the open top 35 being adapted to sealingly mate with the underside of the base member 10 around upflow opening 16. A gasket member 55 is preferably positioned to improve the seal between the base member 10 and upper conduit 31. The midsection 32 of the dispensing means 30 is comprised of one or more flow openings 36 which allow water to flow into the interior of upper conduit 31 and eventually out base member 10 through outlet opening 12. The total area of flow openings 36 should be of sufficient amount so as not to impede flow of water through the device. Preferably, the dispensing means 30 is of sufficient length to abut the bottom 22 of housing 20.

The lower portion of the dispensing means 30 connected to and beneath the apertured midsection 32 encompasses the chemical containing cartridge member 33, which comprises a closed bottom member 37, a side wall 38 containing at least one fluid intake refilling aperture 43 and a top member 39 containing at least one dispensing aperture 41. In the preferred embodiment, there is a single intake aperture 43 and a single dispensing aperture 41. Intake aperture 43 is positioned near the top of side wall 38, preferably adjacent the top member 39. The combination of bottom member 37, side wall 38 and top member 39 form a hollow interior 42 to receive the solid or granular chemical substance 40 to be dissolved. Intake aperture 43 is the only means for water to enter the interior 42 of chemical cartridge 33 and dispensing aperture 41 is the only means for the chemical solution 44 to exit the interior 42 of chemical cartridge 33. Dispensing aperture 41 and intake aperture 43 are sized relatively small in comparison to the interior volume of cartridge 33 and in comparison to the total area of flow openings 36 in the midsection portion 32. For example, in a dispensing means 30 having an internal diameter of approximately 1 and ⅛ inches and a cartridge height of approximately 4 and ¾ inches, the dispensing aperture 41 in top wall 39 and the intake aperture 43 in the side wall 38 should be between approximately ¹⁄₃₂ and ³⁄₁₆ inches in diameter, and preferably about ¹⁄₁₆ inches in diameter. Where multiple dispensing apertures 41 or intake apertures 43 are present, the combined total size of the openings should be in the same range. The size of the intake aperture 43 should be generally equal to the size of the dispensing aperture 41. The size of the intake aperture 43 and dispensing aperture 41 determine the feed rate, and can be varied in relation to the solubility characteristics or desirable concentrations of particular solid chemicals 40 needed for a given application.

The improved chemical dispenser system of this disclosure is illustrated in FIGS. 2 through 8. The adjustable chemical dispensing device 130 will be retained in a flow-through housing in similar manner to the illustrated prior art, such that water or other liquid will flow into the housing, a chemical solution will be dispensed into the water flow by the adjustable chemical dispensing device 130, and the treated water will then exit the housing. Preferably, the chemical dispensing device 130 is formed as a removable cartridge separate from the housing for ease of refill or replacement.

The adjustable chemical dispensing device 130 is seen to generally comprise an upper tube 131 having an apertured midsection 132, and a dispensing chamber 133, the upper tube 131 being open on both ends (top and bottom) and connected in liquid communicating manner to the dispensing chamber 133. A plurality of flow openings 136 provided at the apertured midsection 132 of upper tube 131 allow water to pass into, upward and out of the upper tube 131. A sliding annular gate or sleeve member 172 is positioned on upper tube 131 such that its position can be changed so as to block none or some of the flow openings 136 in the apertured midsection 132. This combination provides a means for adjusting the main water flow rate into and through the upper tube 131 of the chemical dispensing device 130.

The chamber 133 comprises a closed bottom 137 and a side wall or walls 138 such that a receptacle for the solid or granular chemical 142 is defined. The upper end of the chamber 133 is provided with a top wall member 139, which may be formed as an integral part of the chamber 133 or provided as a separate member that is affixed to the chamber 133. The top wall member 139 is provided with an opening 140, preferably semi-circular or pie-shaped, although other configurations may be accommodated.

An inflow gate member 181 is coaxially mounted to the top of chemical dispensing chamber 133 in a manner that allows for relative rotation between the inflow gate member 181 and the top wall member 139 of chamber 133. As shown, one manner of achieving this is to configure inflow gate member 181 as a cap with a base member 183 and a downwardly extending annular flange 182 to abut and receive the upper portion of the chamber side wall 138, with the base member 183 contacting the chamber top wall 139 in parallel manner. A tubular neck portion 184 open at its bottom end extends upwardly from the base member 183, the neck portion 184 having a smaller diameter than that of the base member 183 of the inflow gate member 181. The top of the neck portion 184 is provided with a top wall member 185 having an opening 186 therein, preferably semi-circular or pie-shaped, although other configurations may be accommodated. A plurality of intake refilling apertures 143 are provided in the inflow gate member base member 183, the refilling apertures 143 being exterior to the neck portion 184 and preferably spaced at intervals along a circular arc. The location of the refilling apertures 143 and the opening 140 in the chamber top wall 139 are such that, depending on the rotational position of the inflow gate member 181 relative to the chamber top wall opening 140, any number or none of the refilling apertures 143 will be aligned with the chamber top wall opening 140 such that water may flow into the chamber 133 to dissolve the chemical 142 and create a saturated chemical solution 144 within the upper portion of the chamber 133 and within the neck portion 184 of the inflow gate member. By rotating the inflow gate member 181 relative to the chamber 133, the rate of refill water flow into the chamber 103 may be regulated—increasing or decreasing refilling water flow into the chamber 133 as conditions dictate. This combination defines a means for adjusting water inflow into the chamber 133.

The lower end of the upper tube 131 is coaxially mounted to the neck portion 184 of the inflow gate member 181 in a manner that allows for relative rotational movement therebetween. A lower wall member 191 is provided within upper tube 131, the lower wall member 191 being located such that it will abut the neck top wall 185 in a generally co-planar manner. Multiple dispensing apertures 141 are positioned in the lower wall member 191. One dispensing aperture 141 is centrally located, while other dispensing apertures 141 are located such that depending on the rotational position of the lower wall 191 of the upper tube 131 relative to the neck top wall opening 186, any number or none of the non-centrally located dispensing apertures 141 will be aligned with the neck top wall opening 186 such that saturated chemical solution 144 may be pulled from the dispensing chamber 133 into the interior of the upper tube 131 by the movement of water through the upper tube apertured midsection 132. By rotating the upper tube 131 and lower wall member 191 relative to the inflow gate member 181, the amount of saturated chemical solution 144 drawn into the main water flow stream may be regulated—increasing or decreasing the flow of saturated chemical solution 144 as conditions dictate. The neck opening 186 is preferably positioned such that at least a portion of the centrally disposed dispensing aperture 141 remains unblocked no matter the rotational position of the upper tube 131 relative to the neck portion 184. This combination defines a means for adjusting the flow rate of saturated chemical solution 144 into the main water flow.

Thus, as set forth structurally above, the adjustable chemical dispensing device 130 comprises means for adjusting the rate of main water flow through the device and in particular water flow through the upper tube 131, separate means for adjusting the inflow rate of refill water flow into the dispensing chamber 133 and in particular refill water flow through the inflow gate member 181, and separate means for adjusting the rate of outflow of saturated chemical solution 144 into the main water flow and in particular outflow of saturated chemical solution 144 from the dispensing chamber 133 through the neck portion 184 and into the upper tube 131.

Thus, in combination with a water flow system as shown in the prior art, adjustments can be made in three ways. The means for adjusting the rate of water flow through the device and in particular flow through the upper tube 131 comprises the sliding sleeve member 172 in combination with the flow openings 136 in the upper tube 131, whereby the sleeve member 172 can be lowered so as to partially or fully cover some of the flow openings 136, thereby decreasing the main water flow through the device. If conditions change such that the water flow needs to be increased, the sleeve member 172 is raised to expose more of the flow openings 136. The means for adjusting the rate of refill water flow into the dispensing chamber 133 and in particular refill water flow through the inflow gate member 181 comprises the rotatable inflow gate member 181 in combination with the top wall 139 and relatively large opening 140 at the top of the dispensing chamber 133. By rotating the inflow gate member 181 such that some of the intake refilling apertures 143 are sealed off by the top wall 139, the refill water flow into the dispensing chamber 133 is reduced. Should conditions require an increase in refill water flow, the inflow gate member 181 is rotated relative to the top wall 139 such that more of the refilling apertures 143 are positioned above the opening 140. The means for adjusting the rate of flow of saturated chemical solution 144 into the main water flow and in particular flow of saturated chemical solution 144 from the dispensing chamber 133 through the neck portion 184 and into the upper tube 131 comprises the combination of the dispensing apertures 141 in the lower wall 191 of the upper tube 131 and the top wall 185 and relatively large opening 186 of the neck portion 184 of the inflow gate member 181. By rotating the upper tube 131 such that some or all of the outer dispensing apertures 141 are sealed off by the neck top wall 185, the flow of saturated chemical solution 144 into the interior of the upper tube 131 is reduced—the centrally located dispensing aperture 141 allowing for some flow regardless of the position of the upper tube 131. If the flow rate of saturated chemical solution 144 into the main water flow needs to be increased, the upper tube is rotated relative to the neck top wall 185 and neck opening 186 such that more of the dispensing apertures are aligned with the neck opening 186.

It is contemplated that equivalents and substitutions for certain elements described above may be obvious those skilled in the art, and therefore the true scope and definition of the invention is to be as set forth in the following claims.

I claim:

1. An adjustable chemical dispensing device for introducing a chemical solution into a flow of liquid, said device adapted to be received within a base member adapted to be incorporated into a flow conduit line, said base member having an inlet opening adapted to receive an inlet conduit, an outlet opening adapted to receive an outlet conduit, a downflow opening communicating with said inlet opening, a centrally located upflow opening communicating with said outlet opening, and mating means adapted to receive a cylindrical housing; said cylindrical housing comprising an outer wall, closed bottom and open top, and adapted to mate with said mating means of said base member; said, adjustable chemical dispensing device comprising:
an upper tube connected to a lower chemical dispensing chamber, said upper tube comprising an apertured midsection segment and an open top and an open bottom;
said open top adapted to sealingly mate with said upflow opening of said base member;
said apertured midsection segment having multiple flow openings to allow liquid to flow into said upper tube;
said chemical dispensing chamber comprising a closed bottom, a top wall, at least one side wall, multiple intake refilling apertures, and multiple dispensing apertures, said bottom, top and at least one side wall defining an interior and containing a dissolvable chemical in solid or granular form, whereby refill liquid enters said chemical dispensing chamber through said intake apertures and contacts said chemical to dissolve said chemical and form a saturated chemical solution within said chemical dispensing chamber, and whereby said saturated solution exits said chemical dispensing chamber through said dispensing apertures in response to liquid flow through said apertured midsection and upper tube;
said adjustable chemical dispensing device further comprising
means for adjusting the rate of main liquid flow through said upper tube;
means for adjusting the inflow rate of refill liquid into said chemical dispensing chamber; and
means for adjusting the outflow rate of said saturated chemical solution into said upper tube and said main liquid flow.

2. The device of claim 1, wherein said means for adjusting the rate of main liquid flow through said upper tube comprises a sliding sleeve member disposed on said upper tube, wherein said sleeve member can be positioned to close or open any number of said multiple flow openings.

3. The device of claim 1, wherein said means for adjusting the inflow rate of refill liquid into said chemical dispensing chamber comprises a rotating inflow gate member, said intake refilling apertures being disposed through said gate member, and wherein said chamber top wall contains an opening, wherein said gate member can be rotated relative to said chamber top wall opening to close or open any number of said refilling apertures.

4. The device of claim 3, wherein said means for adjusting the outflow rate of said saturated chemical solution into said upper tube and said main liquid flow comprises a lower wall disposed within said upper tube, said multiple dispensing apertures being disposed through said lower wall, and wherein said inflow gate member comprises a gate member top wall having an opening, wherein said lower wall can be rotated relative to said gate member top wall opening to close or open any number of said dispensing apertures.

5. The device of claim 2, wherein said means for adjusting the inflow rate of refill liquid into said chemical dispensing chamber comprises a rotating inflow gate member, said intake refilling apertures being disposed through said gate member, and wherein said chamber top wall contains an opening, wherein said gate member can be rotated relative to said chamber top wall opening to close or open any number of said refilling apertures.

6. The device of claim 5, wherein said means for adjusting the outflow rate of said saturated chemical solution into said upper tube and said main liquid flow comprises a lower wall disposed within said upper tube, said multiple dispensing apertures being disposed through said lower wall, and wherein said inflow gate member comprises a gate member top wall having an opening, wherein said lower wall can be rotated relative to said gate member top wall opening to close or open any number of said dispensing apertures.

7. An adjustable chemical dispensing device comprising:
an upper tube connected in communicating manner to a lower chemical dispensing chamber;
said upper tube comprising an apertured midsection segment having multiple flow openings to allow liquid to flow from outside of said device into said upper tube;
said chemical dispensing chamber comprising a closed bottom, a top wall, at least one side wall, multiple intake refilling apertures, and multiple dispensing apertures, said bottom, top and at least one side wall defining an interior and containing a dissolvable chemical in solid or granular form, whereby refill liquid enters said chemical dispensing chamber from outside said device through said intake refilling apertures and contacts said chemical to dissolve said chemical and form a saturated chemical solution within said chemical dispensing chamber, and whereby said saturated solution exits said chemical dispensing chamber through said dispensing apertures in response to liquid flow through said apertured midsection and upper tube;
said adjustable chemical dispensing device further comprising:
means for adjusting the rate of liquid flow through said upper tube;
means for adjusting the inflow rate of refill liquid into said chemical dispensing chamber; and
means for adjusting the outflow rate of said saturated chemical solution into said upper tube.

8. The device of claim 7, wherein said means for adjusting the rate of main liquid flow through said upper tube comprises a sliding sleeve member disposed on said upper tube, wherein said sleeve member can be positioned to close or open any number of said multiple flow openings.

9. The device of claim 7, wherein said means for adjusting the inflow rate of refill liquid into said chemical dispensing chamber comprises a rotating inflow gate member, said intake refilling apertures being disposed through said gate member, and wherein said chamber top wall contains an opening, wherein said gate member can be rotated relative to said chamber top wall opening to close or open any number of said refilling apertures.

10. The device of claim 9, wherein said means for adjusting the outflow rate of said saturated chemical solution into said upper tube and said main liquid flow comprises a lower wall disposed within said upper tube, said multiple dispensing apertures being disposed through said lower wall, and wherein said inflow gate member comprises a gate member top wall having an opening, wherein said lower wall can be rotated relative to said gate member top wall opening to close or open any number of said dispensing apertures.

11. The device of claim 8, wherein said means for adjusting the inflow rate of refill liquid into said chemical dispensing chamber comprises a rotating inflow gate member, said intake refilling apertures being disposed through said gate member, and wherein said chamber top wall contains an opening, wherein said gate member can be rotated relative to said chamber top wall opening to close or open any number of said refilling apertures.

12. The device of claim 8, wherein said means for adjusting the outflow rate of said saturated chemical solution into said upper tube and said main liquid flow comprises a lower wall disposed within said upper tube, said multiple dispensing apertures being disposed through said lower wall, and wherein said inflow gate member comprises a gate member top wall having an opening, wherein said lower wall can be rotated relative to said gate member top wall opening to close or open any number of said dispensing apertures.

13. The device of claim 11, wherein said means for adjusting the outflow rate of said saturated chemical solution into said upper tube and said main liquid flow comprises a lower wall disposed within said upper tube, said multiple dispensing apertures being disposed through said lower wall, and wherein said inflow gate member comprises a gate member top wall having an opening, wherein said lower wall can be rotated relative to said gate member top wall opening to close or open any number of said dispensing apertures.

14. An adjustable chemical dispensing device comprising:
   a chemical dispensing chamber retaining a saturated chemical solution;
   means for adjusting the rate of main water flow through said device;
   means for adjusting the inflow rate of refill water into said chemical dispensing chamber; and
   means for adjusting the outflow rate of saturated chemical solution from said chemical dispensing chamber into said main water flow;
   wherein said means for adjusting the rate of main liquid flow through said device comprises a sliding sleeve member disposed on an upper tube having multiple flow openings, wherein said sleeve member can be positioned to close or open any number of said multiple flow openings;
   wherein said means for adjusting the inflow rate of refill liquid into said chemical dispensing chamber comprises a rotating inflow gate member having intake refilling apertures disposed thereon, wherein said inflow gate member can be rotated relative to said chemical dispensing chamber to close or open any number of said refilling apertures; and
   wherein said means for adjusting the outflow rate of said saturated chemical solution from said chemical dispensing chamber comprises a lower wall disposed within said upper tube having multiple dispensing apertures disposed thereon, and wherein said inflow gate member comprises a gate member top wall having an opening, wherein said lower wall can be rotated relative to said gate member top wall opening to close or open any number of said dispensing apertures.

15. The device of claim 14, wherein each of said means for adjusting the rate of main water flow through said device, said means for adjusting the inflow rate of refill water into said chemical dispensing chamber, and said means for adjusting the outflow rate of saturated chemical solution from said chemical dispensing chamber into said main water flow are adjustable independently of the other said means.

16. The device of claim 1, wherein each of said means for adjusting the rate of main water flow through said device, said means for adjusting the inflow rate of refill water into said chemical dispensing chamber, and said means for adjusting the outflow rate of saturated chemical solution from said chemical dispensing chamber into said main water flow are adjustable independently of the other said means.

17. The device of claim 7, wherein each of said means for adjusting the rate of main water flow through said device, said means for adjusting the inflow rate of refill water into said chemical dispensing chamber, and said means for adjusting the outflow rate of saturated chemical solution from said chemical dispensing chamber into said main water flow are adjustable independently of the other said means.

* * * * *